United States Patent [19]

Ludwig et al.

[15] 3,674,869

[45] July 4, 1972

[54] COMPOSITIONS FOR STABILIZING TRANS-DIETHYLSTILBESTROL

[72] Inventors: Nelson H. Ludwig, Greenfield; William A. White, Fountaintown, both of Ind.

[73] Assignee: Eli Lilly and Company, Indianapolis, Ind.

[22] Filed: June 12, 1970

[21] Appl. No.: 45,911

[52] U.S. Cl.....................................424/175, 260/619, 424/346
[51] Int. Cl......................................A61k 17/06, A61k 27/00
[58] Field of Search..........................424/175, 346; 260/619

[56] References Cited

UNITED STATES PATENTS 3,042,525   7/1962   Mattox .................................424/346

Primary Examiner—Sam Rosen
Attorney—Everet F. Smith and Walter E. Buting

[57] ABSTRACT

Trans-diethylstilbestrol is stabilized in liquid and solid animal feed formulations by adding thereto an inhibitory amount of a compound containing sulfur, in the form of a thiol group or a thiol precursor group, to substantially inhibit isomerization to the cis-diethylstilbestrol. Elemental sulfur likewise inhibits the isomerization in the presence of base.

4 Claims, No Drawings

COMPOSITIONS FOR STABILIZING TRANS-DIETHYLSTILBESTROL

BACKGROUND OF THE INVENTION

Diethylstilbestrol (DES), $\alpha,\alpha'$-diethyl-4,4'-stilbenediol is a well known growth promoting substance which is commonly employed as a feed additive for fattening ruminants. The trans-isomer of diethylstilbestrol, represented by the following formula, is the biologically active isomeric form

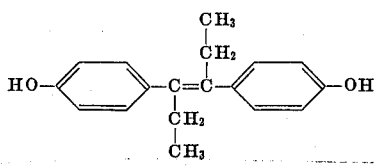

cis-Diethylstilbestrol of the formula

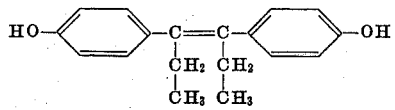

is reported by Dodds to have only one-twentieth of the estrogenic activity of the trans isomer. C. Dodds, Biochemical Contribution to Endocrinology, Experiments in Hormonal Research, p. 34, Stanford Univ. Press, Stanford, Calif. 1957. It has also been found that the cis isomer is essentially inactive in growth promotion and nitrogen retention studies carried out in lambs. The cis isomer is also reported to be the less stable isomer, tending to isomerize readily into the more stable trans-diethylstilbestrol. The Merck Index, 7th Ed., P. 354 (1960). It has been generally accepted until now that diethylstilbestrol, as contained in various agricultural formulations, exists solely in the active trans form.

Investigation prompted by observed variations in biological assay levels of diethylstilbestrol-containing agricultural formulations has revealed the heretofore unrecognized presence of the inactive cis-diethylstilbestrol in such formulations. Levels of cis-diethylstilbestrol ranging from about 10 percent to about 30 percent of total diethylstilbestrol content have been found in such formulations. A concurrent decrease in the amount of trans-diethylstilbestrol is observed.

Stability studies undertaken to explain the decrease in trans-diethylstilbestrol content in liquid and dry formulations have indicated that the active trans isomer is converted to the inactive cis isomer. Stabilized trans-diethylstilbestrol formulations, therefore, would constitute an important contribution in animal husbandry.

SUMMARY

This invention is concerned with stabilized diethylstilbestrol formulations. In particular this invention is concerned with stabilized diethylstilbestrol (DES) formulations in which the isomerization of the biologically active trans isomer of DES to the inactive cis isomer is substantially inhibited. This invention is also concerned with a method for inhibiting the isomerization of trans-DES in animal feed compositions.

According to the practice of this invention, the addition of an organic or inorganic sulfur containing compound as hereinafter defined to a trans-DES containing formulation substantially inhibits the isomerization of trans-DES to cis-DES.

The sulfur containing compounds useful in the practice of this invention are organic and inorganic compounds containing the thiol (SH) functional group or a relatively labile derivative thereof capable of forming the thiol group, as for example by hydrolysis or enolization. The inhibitory sulfur compounds of this invention include inorganic compounds, such as thiophosphoric acid, thiophosponic acid, hydrosulfuric acid, hydrosulfurous acid, the alkali metal, alkaline earth metal, ammonium and organic amine salts of the foregoing thioacids, ammonium sulfide, ammonium polysulfide, the alkali and alkaline earth metal sulfides and polysulfides; elemental sulfur employed in combination with a base; and the organic compounds represented by the formula

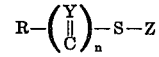

wherein R is amidino, $C_1$-$C_4$ di lower alkylamino, $C_1$-$C_4$ alkoxy, $C_1$-$C_{18}$ alkyl, $C_2$-$C_{18}$ alkenyl, $C_2$-$C_{18}$ alkynyl, $C_5$-$C_{10}$ cycloalkyl, $C_5$-$C_{12}$ bicycloalkyl, aryl, heteroaryl, $C_1$-$C_{18}$ alkyl substituted by carboxy, halogen, amino, $C_1$-$C_4$ di lower alkylamino, hydroxy, or $C_1$-$C_4$ alkoxy; Y is oxygen or sulfur, n is 0 or 1 and Z is hydrogen, an alkali metal cation, an alkaline earth metal cation, $C_1$-$C_4$ alkanoyl, $C_1$-$C_4$ lower alkyl, benzyl, or a group of the formula

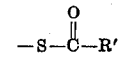

wherein R' is $C_1$-$C_4$ lower alkyl or an aryl group selected from the group consisting of phenyl, naphthyl, pyridyl, pyrimidyl, pyrryl, thiazyl and thiazolyl; with the limitation that when R is $C_1$-$C_4$ di lower alkylamino or $C_1$-$C_4$ alkoxy, Y is sulfur and n is 1, and when R is amidino, n is 0 and Z is $C_1$-$C_4$ lower alkyl or benzyl.

DETAILED DESCRIPTION

According to the practice of the present invention, the addition of a sulfur containing compound in which the sulfur is in the form of a thiol group or a thiol precursor group, to a trans-DES containing formulation substantially inhibits the isomerization of trans-DES to cis-DES.

The sulfur containing compounds useful in the practice of this invention are both inorganic and organic sulfur containing compounds.

As employed herein the term inorganic sulfur containing compound refers to a compound such as thiophosphoric acid, thiophosphonic acid, hydrosulfuric acid, hydrosulfurous acid, the alkali metal and alkaline earth metal salts of the foregoing thioacids, ammonium sulfide, ammonium polysulfide, the alkali metal and alkaline earth metal sulfides, and the alkali metal and alkaline earth metal polysulfides. The term "alkali metal" refers to lithium, sodium, potassium and like metals and alkaline earth metal refers to calcium, barium, magnesium and like metals although among the alkali metals sodium and potassium are preferred and among the alkaline earth metals, calcium and magnesium are preferred.

Elemental sulfur when employed in combination with an inorganic or organic base likewise inhibits the isomerization of trans-DES.

The term "base" as used in the above definition refers to ammonia, ammonium hydroxide, the organic amines selected from among the primary $C_1$-$C_5$ alkyl amines such as methyl amine, butyl amine, isopropyl amine, n-amyl amine and the like, the secondary alkylamines containing $C_1$-$C_5$ alkyl groups such as dimethylamine, methyl-n-butylamine, di-n-propylamine, ethyl-n-amylamine, di-sec-butylamine and the like, the tertiary alkylamines containing $C_1$-$C_5$ alkyl groups such as triethylamine, tri-n-butylamine, methyl-di-n-amylamine and the like, the $C_1$-$C_5$ hydroxy and amino substituted mono-di-and trialkylamines such as ethanolamine, triethanolamine, ethylenediamine, propylenediamine, butane-1, 4-diamine, di-(4-hydroxybutyl) amine and the like, and the inorganic bases such as the alkali and alkaline earth metal bicarbonates, carbonates and hydroxides, for example, sodium bicarbonate, potassium carbonate, sodium hydroxide, calcium hydroxide and the like.

The term organic sulfur containing compound refers to a compound selected from the group represented by the following general formula

wherein R is amidino, $C_1$–$C_4$ di lower alkylamino, $C_1$–$C_4$ alkoxy, $C_1$–$C_{18}$ alkyl, $C_2$–$C_{18}$ alkenyl, $C_2$–$C_{18}$ alkynyl, $C_5$–$C_{10}$ cycloalkyl, $C_5$–$C_{12}$ bicycloalkyl, aryl, heteroaryl, $C_1$–$C_{18}$ alkyl substituted by carboxy, halogen, amino, $C_1$–$C_4$ di lower alkylamino, hydroxy, or $C_1$–$C_4$ alkoxy; Y is oxygen or sulfur, n is 0 or 1 and Z is hydrogen, an alkali metal cation, an alkaline earth metal cation, $C_1$–$C_4$ alkanoyl, $C_1$–$C_4$ lower alkyl, benzyl, or a group of the formula

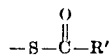

wherein R' is $C_1$–$C_4$ lower alkyl, phenyl, naphthyl, pyridyl, pyrimidyl, pyrryl, thiazyl or thiazolyl, with the limitations that when R is $C_1$–$C_4$ di lower alkylamino or $C_1$–$C_4$ alkoxy, Y is sulfur and n is 1, and when R is amidino, n is 0 and Z is $C_1$–$C_4$ lower alkyl or benzyl. $C_1$–$C_4$ lower alkyl refers to methyl, ethyl, n-propyl, iso-propy, n-butyl, iso-butyl, sec-butyl and tert-butyl. The term $C_1$–$C_{18}$ alkyl refers to the straight or branched chain alkyl groups such as methyl, butyl, heptyl, octyl, decyl, dodecyl, tetradecyl, octadecyl and the like. $C_2$–$C_{18}$ alkenyl refers to vinyl, allyl, butenyl, octenyl, dodecenyl, octadecenyl and like straight and branched unsaturated chains. $C_3$–$C_{18}$ alkynyl refers to propargyl, butynyl, hexynyl, octynyl, dodecynyl, hexadecynyl, octadecynyl and the like. "$C_1$–$C_4$ alkoxy" refers to methoxy, ethoxy, n-propoxy, iso-propoxy, n-butoxy, sec-butoxy and iso-butoxy. "$C_5$–$C_{10}$ cycloalkyl" refers to cyclopentyl, cyclohexyl, cycloheptyl, cyclooctyl, methylcyclopentyl, dimethylcyclohexyl, isopropylcyclohexyl, methylcycloheptyl and the like. Halogen refers to fluoro, chloro, bromo and iodo.

The term aryl or heteroaryl refers to phenyl, α-naphthyl, β-naphthyl, 2-pyridyl, 3-pyridyl, 4-pyridyl, pyrimidyl, 2-pyrryl, 3-pyrryl, 2-imidazolyl, 2-benzimidazolyl, 2-benzoxyazolyl, 2-thiazyl, 2-thiazolyl, and such aryl and heteroaryl groups substituted by $C_1$–$C_4$ lower alkyl, $C_1$–$C_4$ lower alkoxy, carboxy, $C_1$–$C_4$ alkoxycarbonyl, amino, $C_1$–$C_4$ alkyl substituted amino, hydroxy, halogen and trifluoromethyl.

Representative sulfur containing compounds useful in the practice of this invention include the aliphatic mercaptans, such as methyl mercaptan, isopropyl mercaptan, n-amyl mercaptan, 3-pentanethiol, n-heptyl mercaptan, n-dodecyl mercaptan, octadecyl mercaptan and the like; the substituted aliphatic mercaptans such as 2-aminoethanethiol, 2-dimethylaminoethanethiol and the hydrochloride salts thereof, β-chloropropylmercaptan, 2-methoxyethylmercaptan, 3-hydroxypropyl mercaptan, β-ethoxybutyl mercaptan, β-n-butoxybutyl mercaptan, cysteine, β-mercaptopropionic acid, Δ-mercaptovaleric acid, w-mercaptododecanoic acid; the alkenyl mercaptans such as allyl mercaptan, isobutenyl mercaptan, dodecenyl mercaptan, octadecenyl mercaptan and the like; the alkynyl mercaptans such as 2-butynyl mercaptan, 7-decynyl mercaptan, 11-dodecynyl mercaptan, 17-octadecynyl mercaptan and the like; the cycloaliphatic mercaptans such as cyclopentanethiol, cyclohexanethiol, 4-ethylcyclohexane thiol and the like; the bicycloaliphatic mercaptans such as pinane thiol, camphane thiol, bicyclo[2,2,2]octane-2-thiol and the like; the di lower alkyl-dithiocarbamates such as sodium dimethyldithiocarbamate, potassium diethyldithiocarbamate, tetramethylthiuram disulfide, sodium di-n-butyldithiocarbamate and the like; the xanthates such as potassium ethylxanthate, potassium n-butylxanthate, potassium methylxanthate and the like; the thiophenols such as thiophenol 4-bromothiophenol, 4-chlorothiophenol, pentachlorothiophenol, 3,4-dichlorothiophenol, 4-fluorothiophenol, 4-methoxythiophenol, 4-sec-butoxythiophenol, 3-mercaptobenzoic acid, thiosalicylic acid, 4-fluorothiophenol, m-thiocresol, p-thiocresol, o-n-propylthiophenol, 4-isopropylthiophenol, 4-n-butylthiophenol, p-aminothiophenol, p-dimethylaminothiophenol, o-aminothiophenol, 4-hydroxythiophenol, ethyl-3-mercaptobenzoate, n-butyl-4-mercaptobenzoate, 2-mercaptonaphthylene, 1-mercaptonaphthylene and like thiophenols; the aromatic heterocyclic mercaptans such as 2-mercaptoimidazole, 2-mercaptobenzimidazole, 2-mercaptopyrimidine, 2-mercapto-5-chlorobenzimidazole, 2-mercapto-5-methylpyrimidine, 2-mercapopyridine, 2-mercaptonicotinic acid, 3-mercaptopyridine, 4-mercaptopyridine, 2-mercapto-4-methylpyridine, 2-mercaptothiazole, 2-mercaptothiazine, 3-mercaptopyrrole and the like; the diaroyl and dialkanoyl disulfides such as dibenzoyl disulfide, di-2-naphthoyldisulfide, diacetyldisulfide, dibutanoyldisulfide, dinicotinoyldisulfide and the like; the pseudothiourea salts such as 2-benzyl-2-thiopseudourea hydrochloride, 2-methyl-2-thiopseudourea hydrochloride, 2-n-butyl-2-thiopseudourea hydrobromide and the like.

As can be seen from the foregoing list of operative compounds it will be recognized by those skilled in the art that any organic thiol compound which has suitable stability characteristics and which is compatible with the ingredients of the desired formulation will inhibit the isomerization of trans-DES.

A preferred group of thiol compounds of this invention includes the following:

Thiophenol

Benzoyldisulfide

1-Cysteine

2-Mercaptonicotinic acid

2-Mercaptopyrimidine

As previously mentioned above, elemental sulfur, when employed in combination with a base such as sodium bicarbonate or ammonium hydroxide, is effective as an inhibitor of trans-DES isomerization and is a preferred substance of this invention. The combination of sulfur and ammonium hydroxide has the advantage of being less costly while yet highly effective for stabilizing trans-DES in animal feed formulations.

The compounds described herein are either commercially available or readily prepared by methods well known to those skilled in the art.

The majority of the sulfur containing compounds described herein can be designated as thiol compounds or as mercaptans. Likewise included in the definition of inhibitory compounds described herein are mercaptan precursor compounds, such as those derivatives of mercaptans which readily form mercaptans. For example S-alkanoyl and S-aroyl compounds can be hydrolysed to S-H compounds.

The sulfur containing compounds of this invention inhibit the isomerization of trans-DES when the growth promotant is formulated, as for example, as a liquid premix composition or when it is absorbed on or admixed with a solid carrier, for example in a dry premix.

The isomerization of trans-DES is effectively inhibited when the sulfur containing compound is employed at inhibitory amounts from about 1 percent to about 100 percent of the weight of DES contained in the liquid or dry formulation. Higher concentrations of the sulfur containing compounds of this invention can be employed but are not necessary in order to obtain effective inhibition of trans-DES isomerization.

Since DES finds its most general use as a growth promoter in ruminants when incorporated into the animals' feed, the inhibition of trans-DES isomerization to the cis-form is especially important in such feeds. Animal feed compositions, refer to feed compositions commonly employed for feeding livestock such as the liquid premix compositions, solid or dry premix compositions, feed supplements, and finished feed compositions.

Liquid premixes commonly employed are prepared with a variety of edible liquid carriers such as ethanol, propylene glycol, soybean oil, corn oil and polyethylene glycol. Solid or dry premixes are commonly prepared with a number of edible solid carriers, for example, alfalfa granules, soybean meal, rice hulls and like nutritive carriers. Generally, the liquid or solid premixes containing a relatively high level of DES are prepared initially and are then used by blending or mixing with the feed stock to obtain the desired level of DES in the finished feed.

A preferred liquid premix of this invention comprises about 10 percent trans-DES and about one percent thiophenol in polyethylene glycol having a molecular weight of from about 200 to 600. Another preferred premix of the present invention comprises about 10 percent trans-DES, about 1 percent sulfur and about 1 percent of concentrated ammonium hydroxide in polyethylene glycol having a molecular weight of about 200 to about 600. The percentages recited in the above preferred premixes are expressed on a weight-of-ingredient per volume-of-solvent basis.

Although the isomerization of trans-DES is inhibited by relatively low concentrations of the sulfur containing compounds of this invention, it will be recognized by those skilled in the art that considerable variations in the concentrations of inhibitors is possible and that amounts in excess of the effective amounts recited herein will also be effective. However, with any given inhibitor, the use of higher concentrations may be disadvantageous.

The preferred liquid premixes of this invention are prepared by first dissolving or suspending the sulfur containing compound in polyethylene glycol having a molecular weight of about 200 and then warming the solution or suspension to a temperature of about 50° C. The solid trans-DES is then added with stirring and the solution or suspension is maintained at about 50° C. until all the added trans-DES was dissolved.

A preferred solid or "dry" premix of this invention comprises about 2 g. of trans-DES, about 0.2 g. of sulfur and about 0.2 g. of 28 percent aqueous ammonium hydroxide per pound of alfalfa granules.

Another preferred solid premix comprises about 10 g. of trans-DES and about 1 g. of thiophenol per pound of alfalfa granules.

The preferred solid premixes described above are prepared by first making up a liquid premix as described above and then mixing or blending the liquid premix with the alfalfa granules. Alternatively, the sulfur containing compound and trans-DES can be added to and mixed with the dry alfalfa granules.

The preferred liquid and solid feed premix compositions of this invention are particularly useful for mixing or blending with other feed compositions such as feed supplements and finished livestock feeds.

The determination of the cis- and trans-DES content of the various compositions described herein was accomplished by gas-liquid chromatography (G.L.C.) of the bis-trimethylsilyl ether derivative of DES. A small sample containing the DES was allowed to react with bis-trimethylsilylacetamide (BSA) for about 20 minutes, and the bis ether derivative was taken up in chloroform. The chloroform solution was then injected into an F and M-402 G.L.C. column containing 5 percent XE60 (silicone gum nitrile, supplied by applied Science Labs., P. O. Box 140, State College, Pa.) and the chromatogram was run at a temperature of about 185°C. The ratio of cis and trans isomers was determined by calculating the area under the respective isomer peaks on the recorded printout. In the case of liquid preparations, three drops of the sample were reacted with ½ ml. of BSA for about 20 minutes. The reaction solution was then diluted with chloroform to a volume of 5 ml., and the diluted solution was injected into the chromatogram. In the case of solid preparations, 1 gram of the preparation was allowed to react with excess BSA and the bis-trimethylsilylethers of the respective isomers of diethylstilbestrol were extracted with chloroform for injection into the chromatogram.

As previously mentioned, stability studies carried out on DES compositions without added stabilizer indicated the isomerization of the active trans isomer to the inactive cis isomer. Table 1 shows the percentage of the cis isomer formed with time when a solution of trans-diethylstilbestrol in propylene glycol is maintained at elevated temperatures.

TABLE I

Percent cis-Diethylstilbestrol in Propylene Glycol

| Time (min.) | Percent cis at T° C. | | |
|---|---|---|---|
| | 60 | 80 | 100 |
| 15 | 2 | 15 | 24 |
| 30 | 4 | 19 | 25 |
| 60 | 7 | 23 | 25 |
| 120 | 14 | 24 | 25 |

The data presented in Table I indicate that under the conditions of time and temperature shown, trans-diethylstilbestrol undergoes extensive isomerization to cis-DES. At a temperature of about 100° C., the percentage of cis isomer formed appears to reach a constant value, indicating that an equilibrium mixture of cis and trans isomers is present.

The data presented in the following Table II illustrates the effectiveness of a number of the sulfur containing compounds of this invention in inhibiting the isomerization of trans-DES.

The data presented were obtained in the following manner: one-half gram of the sulfur containing compound was added to 50 ml. of propylene glycol and the solution or suspension was heated to a temperature of about 60° to 65° C. Two and a half grams of trans-DES was added with stirring and the resulting solution or suspension was maintained at a temperature of about 65° C. for 16 hours. The solution was exposed to air and light throughout the heating period. A small sample of the solution was then withdrawn, and following the G.L.C. analytical procedure described above, the percent trans-DES contained in the solution after 16 hours was determined.

TABLE II

Stabilized trans-Diethylstilbestrol Premix[1]

| Sulfur Compound Stabilizer | Percent trans-DES at 65° C. and 16 hours |
|---|---|
| 2-Aminoethanethiol | 95 |
| 2-Dimethylaminoethanethiol hydrochloride | 96 |
| Thiophenol | 99 |
| 4-Bromothiophenol | 99 |
| 4-Chlorothiophenol | 98 |
| 2,5-Dichlorothiophenol | 97 |
| 3,4-Dichlorothiophenol | 99 |
| Pentachlorothiophenol | 99 |
| n-Heptylmercaptan | 91 |
| Benzoyldisulfide | 99 |
| 1-Cysteine | 99 |
| 2-Benzyl-2-thiopseudourea hydrochloride | 85 |
| 2-Mercaptonicotinic acid | 99 |
| Thiosalicylic acid | 97 |
| 2-Mercaptopyrimidine | 99 |
| Dimethyldithiocarbamic acid, sodium salt | 98 |
| Ammonium sulfide | 99 |
| Control | 77 |

[1]Propylene glycol

As shown by the data presented in Table II, the sulfur containing compounds effectively inhibit the isomerization of trans-DES when employed alone. However, they can be optionally employed in combination with a base as defined herein and when so used are equally effective as isomerization inhibitors. In many instances, the inhibitory effectiveness is enhanced by the use of a base in combination with a sulfur containing compound.

Table III which follows shows the percent trans-DES present in a liquid premix containing sulfur in combination with the indicated base.

TABLE III

Sulfur-Base Stabilized trans-Diethylstilbestrol Premix[1]

| Base | Percent trans-DES at 65° C. and 16 hours |
| --- | --- |
| Ethanolamine | 98 |
| Ammonium hydroxide[2] | 98 |
| Sodium bicarbonate | 93 |
| Sulfur alone | 77 |
| Control | 77 |

[1] trans-DES, 2.5 g.; Base, 0.5 g.; S, 0.5 g.; 50 ml. of propylene glycol.
[2] 0.5 g. of 28 percent ammonium hydroxide The sulfur-base stabilized premixes are prepared in the same manner as described above for the premixes of Table II; however, a substantial amount of the sulfur is present as a fine suspension.

The following examples more fully illustrate the present invention.

EXAMPLE 1

Thiophenol Stabilized trans-DES Liquid Premix

One gram of thiophenol was added to 100 ml. of polyethylene glycol having an average molecular weight of 200 and the solution was heated to a temperature of about 50° C. Ten grams of trans-DES were added and when complete solution was obtained the premix was allowed to cool to room temperature.

Liquid premixes with lower concentrations of trans-DES are prepared by diluting the 10 percent premix with the required amount of polyethylene glycol.

EXAMPLE 2

Stabilized trans-DES Solid Premix

One hundred ml. of a stabilized liquid premix containing 10 percent trans-DES in polyethylene glycol-200 and 1 percent thiophenol, prepared as described in Example 1, is added to 350 g. of alfalfa granules and the mixture is thoroughly blended in a mixer. The resulting moist solid alfalfa premix contains 10 g. of trans-diethylstilbestrol per pound of alfalfa granules, a suitable premix for incorporation into finished animal feeds.

EXAMPLE 3

Sulfur-Base Stabilized trans-DES Premix

One-half gram of flowers of sulfur was added to 100 ml. of polyethylene glycol 200 and the suspension was heated to a temperature of 50° C. One-half gram of concentrated (28 percent) ammonium hydroxide and 5 g. of trans-DES were added. When all of the added DES was in solution, the suspension was allowed to cool to room temperature. The resulting 5 percent trans-DES premix contained a substantial amount of sulfur in suspension.

EXAMPLE 4

Sulfur-Base Stabilized trans-DES Solid Premix

The liquid premix prepared as described by Example 3 was stirred vigorously and blended thoroughly with 350 g. of alfalfa granules in a commercial mixer. The sulfur-base stabilized alfalfa premix thus obtained contained 5 grams of trans-DES per pound of premix and was suitable for incorporating into finished feed stocks for livestock consumption.

We claim:

1. A stabilized trans-diethylstilbestrol composition which comprises from about 0.1 percent to about 15 percent by weight of trans-diethylstilbestrol, from about 0.01 percent to about 15 percent by weight of a sulfur containing compound selected from the group consisting of (1) an inorganic sulfur containing compound selected from the group consisting of ammonium sulfide, ammonium polysulfide, the alkali metal sulfides, the alkali metal polysulfides, the alkaline earth metal sulfides, the alkaline earth metal polysulfides, thiophosphoric acid, thiophosphonic acid, hydrosulfuric acid, hydrosulfurous acid, and the alkali metal, alkaline earth metal, ammonium and amine salts of the foregoing acids, (2) elemental sulfur in the presence of a base, and (3) an organic sulfur containing compound of the formula

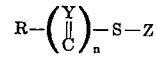

wherein R is amidino, $C_1$–$C_4$ di lower alkylamino, $C_1$–$C_4$ alkoxy, $C_1$–$C_{18}$ alkyl, $C_2$–$C_{18}$ alkenyl, $C_2$–$C_{18}$ alkynyl, $C_5$–$C_{10}$ cycloalkyl, $C_5$–$C_{12}$ bicycloalkyl, $C_1$–$C_{18}$ alkyl substituted by carboxy, halogen, amino, $C_1$–$C_4$ di lower alkylamino, hydroxy, $C_1$–$C_4$ alkoxy or an aryl or heteroaryl group selected from the group consisting of phenyl naphthyl, pyridyl, pyrimidyl, pyrryl, imidazolyl, benzimidazolyl, benzoxazolyl, thiazyl and thiazolyl; Y is oxygen or sulfur, $n$ is 0 or 1 and Z is hydrogen, an alkali metal cation, an alkaline earth metal cation, $C_1$–$C_4$ alkanoyl, $C_1$–$C_4$ lower alkyl, benzyl, or a group of the formula

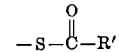

wherein R' is $C_1$–$C_4$ lower alkyl or an aryl or *heteroaryl* group selected from the group consisting of phenyl, naphthyl, pyridyl, pyrimidyl, pyrryl, thiazyl, and thiazolyl; with the limitation that when R is $C_1$–$C_4$ di lower alkylamino or $C_1$–$C_4$ alkoxy, $n$ is 1 and Y is sulfur, and when R is amidino, $n$ is 0 and Z is $C_1$–$C_4$ lower alkyl or benzyl; and an edible carrier.

2. The composition of claim 1 wherein the sulfur containing compound is thiophenol.

3. The composition of claim 1 wherein the sulfur containing compound is sulfur, in the presence of a base.

4. The composition of claim 1 wherein the sulfur containing compound is ammonium sulfide.

* * * * *